US008118229B2

(12) United States Patent
Krishnan et al.

(10) Patent No.: US 8,118,229 B2
(45) Date of Patent: Feb. 21, 2012

(54) METHOD OF PRINTING MARKS ON AN OPTICAL ARTICLE

(75) Inventors: Kasiraman Krishnan, Clifton Park, NY (US); Marc Brian Wisnudel, Clifton Park, NY (US); James Mitchell White, Niskayuna, NY (US); David Gilles Gascoyne, Niskayuna, NY (US); Katherine Lee Jackson, Colonie, NY (US); Swapnil Girish Bondre, Bridgewater, NH (US)

(73) Assignee: NBCUniversal Media, LLC, Wilmington, DE (US)

( * ) Notice: Subject to any disclaimer, the term of this patent is extended or adjusted under 35 U.S.C. 154(b) by 1132 days.

(21) Appl. No.: 11/864,524

(22) Filed: Sep. 28, 2007

(65) Prior Publication Data

US 2009/0086617 A1 Apr. 2, 2009

(51) Int. Cl.
*G06K 19/00* (2006.01)

(52) U.S. Cl. ......................... 235/487; 235/454; 235/497

(58) Field of Classification Search .................. 235/454, 235/487, 494, 497

See application file for complete search history.

(56) References Cited

U.S. PATENT DOCUMENTS

| | | | | |
|---|---|---|---|---|
| 4,374,001 | A | 2/1983 | Bernier | |
| 4,444,626 | A | 4/1984 | Bernier et al. | |
| 5,141,622 | A | 8/1992 | Fauteux et al. | |
| 5,491,262 | A | 2/1996 | Hung | |
| 5,781,221 | A | 7/1998 | Wen et al. | |
| 5,984,448 | A | 11/1999 | Yanagawa | |
| 6,000,332 | A * | 12/1999 | Hruby et al. | 101/129 |
| 6,795,464 | B2 | 9/2004 | Lawandy | |
| 2002/0163479 | A1 | 11/2002 | Lin et al. | |
| 2004/0022542 | A1 | 2/2004 | Atkinson | |
| 2004/0054594 | A1 | 3/2004 | Forster et al. | |
| 2005/0053865 | A1 | 3/2005 | Wisnudel et al. | |
| 2005/0110978 | A1 | 5/2005 | Potyrailo et al. | |
| 2005/0167510 | A1 | 8/2005 | Potyrailo et al. | |
| 2006/0028924 | A1 | 2/2006 | Atkinson | |
| 2006/0234003 | A1 | 10/2006 | Selinfreund | |
| 2006/0237349 | A1 * | 10/2006 | Solomon | 209/509 |
| 2007/0070867 | A1 | 3/2007 | Forster et al. | |
| 2009/0141604 | A1 * | 6/2009 | Tamura et al. | 369/53.31 |

FOREIGN PATENT DOCUMENTS

| | | | |
|---|---|---|---|
| WO | 98/40930 | A1 | 9/1998 |
| WO | 2004/095447 | A1 | 11/2004 |

OTHER PUBLICATIONS

Calvert, P., "Inkjet printing for materials and devices", Chem. Mater. 2001, 13, 3299-3305.

de Gans, B.-J., Schubert, U.S., "Ink-jet Printing of Well-Defined Polymer Dots and Arrays", Langmuir 2004, 20, 7789-7793.

Taylor, J., Johnson, M., Crawford, C.G., "DVD Demystified", 3rd Ed., McGraw-Hill; 2006, Chapter 7-1 to 7-30 and Chapter 9-1 to 9-33 ( 65 pages).

PCT International Search Report dated Nov. 10, 2008.

* cited by examiner

*Primary Examiner* — Karl D. Frech
(74) *Attorney, Agent, or Firm* — Fletcher Yoder

(57) ABSTRACT

An optical article with a plurality of optically detectable marks on a first surface of the optical article, wherein a mark of the plurality of marks has a thickness of less than or equal to about 1 micrometer, and wherein the plurality of optically detectable marks have uniform thickness.

29 Claims, 11 Drawing Sheets

METHOD OF PRINTING MARKS ON AN OPTICAL ARTICLE

RELATED APPLICATIONS

This non-provisional application is related to U.S. non-provisional application US-2005-0112358-A1 filed Nov. 24, 2003.

BACKGROUND

The invention relates generally to a method of printing marks on an article. More particularly the invention relates to a screen-printing or ink-jet printing method for printing uniform marks on an optical article for use as part of a limited play optical article or for use as part of an anti-theft system.

In some applications, it is desirable to limit the playable lifetime of an optical article. For example, a need exists for machine-readable optical articles which provide limited access to music, movies, other forms of digital entertainment, or any other data for which limited access is appropriate, wherein said optical articles do not need to be returned to the provider at the end of a limited period of access. Limited-play optical articles provide a solution to this problem.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though close circuit surveillance cameras may be located at such places, theft still occurs. Consumer products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor or anti-theft tags may be easily removed.

Although these prior art examples demonstrate a long-felt need in the art for a secure DVD, at least some of them involve relatively complex structures which must be produced through complicated manufacturing processes or need special readers to operate the DVD properly.

Accordingly, there remains a need for an improved solution to the long-standing problem. The method described herein fills this need by employing a printing method that will permit use of the DVD only by a consumer.

BRIEF DESCRIPTION

One embodiment of the present disclosure is directed to an optical article with a plurality of optically detectable marks on a first surface of the optical article, wherein a mark of the plurality of marks has a thickness of less than or equal to about 1 micrometer, and wherein the plurality of optically detectable marks have uniform thickness.

Another embodiment of the present disclosure is directed to a method of printing comprising, placing a plurality of optically detectable marks on an optical article using a screen-printing method, wherein a mark of the plurality of marks has a thickness of less than or equal to about 1 micrometer, and wherein the plurality of optically detectable marks have uniform thickness.

Still another embodiment of the present disclosure is directed to a method for manufacturing an optical article comprising aligning the optical article, printing one or more optically detectable marks on a first surface of the optical article with an ink composition, wherein the ink composition comprises a binder material, an optical-state change material, an additive and a solvent.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
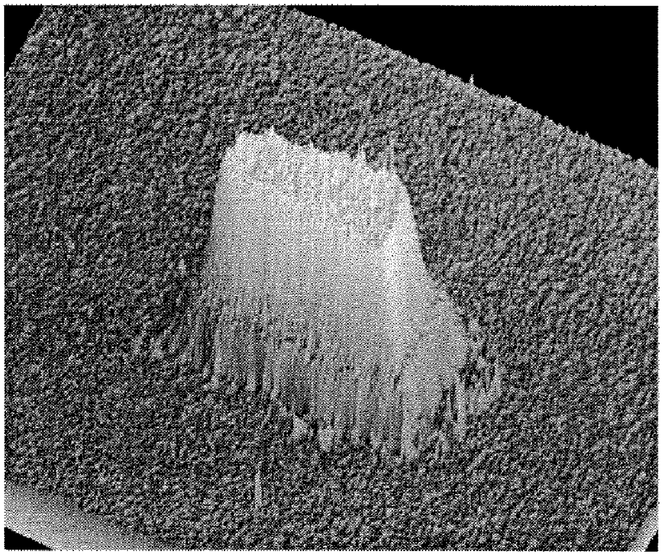
FIG. 1 shows the optical profilometry image of a screen printed coating obtained according to an embodiment described herein.

The invention relates generally to a method of printing marks on an article. More particularly the invention relates to a screen-printing method for printing uniform marks on an optical article for use as part of a limited play optical article or for use as part of an anti-theft system.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

One solution to the shoplifting problem, specifically for optical media articles such as DVD's, is to render at least a portion of the content of the DVD inaccessible unless the retailer at the point-of-sale has activated the DVD. One approach to rendering the content of the DVD inaccessible prior to activation is to employ an ink composition to deposit a coating composition in or on the DVD, wherein the coating composition at least partially absorbs the incident laser light from an optical data reader so that the complete data directly in the optical path of the laser light cannot be read. In this instance, the optical article has no value, and therefore there is no incentive for the shoplifter to steal it. However, upon converting the DVD to an "activated" state using an external stimulus at the point-of-sale, the coating composition becomes sufficiently transparent, with respect to the wavelength of the laser light employed in the optical data reader, due to a change in the optical properties of the coating composition, and the complete data directly in the optical path of the laser light can now be read by the incident laser light from the optical data reader, therefore rendering the full content of the DVD accessible to a legitimate consumer.

In some applications it may be required to limit the accessibility or playability of certain content in an optical article. There are several methods known in the art to make limited-play optical articles. For example, specific regions (eg. sectors) of the optical article may correspond to authoring or navigation logic that may determine a specific content to be played. Furthermore a coating composition may be deposited in or on the optical article over the specific regions that could control the navigation logic. The coating composition may at least partially absorbs the incident laser light from an optical data reader so that the complete data directly in the optical path of the laser light may not be read. During a first or initial number of plays of a DVD, for example, the sectors may be unreadable, causing the data reader system to indicate a non-recoverable parity mismatch, at which point the limited-use content, such as a trailer and/or advertisement, may be played without any choices by the user. However, after the initial number of plays of the DVD, when the mark may be sufficient bleached, the specific regions could be read. This may give a user the ability to see the limited-use content again, if desired, or to skip the limited-use content entirely, if desired. Alternately, the mark may be disposed over some specific regions of the optical article that may not directly correspond to any limited-use content. In this instance, upon noting a non-recoverable parity mismatch resulting from the unbleached mark, the optical data reader may be directed to a portion of the optical article, which stores the limited-use content. However, after the initial number of plays of the DVD, when the mark may be sufficient bleached, the optical data reader may be directed to another portion of the optical disc, thus bypassing the limited-use content data. Thus, such an optical article may be authored for detecting a change of optical state of the mark disposed in or on the optical article and for directing the optical data reader to another portion of the content. A mark with a uniform thickness may be defined as a mark having substantially constant thickness or is substantially free of surface roughness or other defects such as "coffee ring". In one embodiment, the thickness varies by less than 10 percent across the mark. Non-uniformity in thickness of the mark may result in non-recoverable parity mismatches when the optical data reader attempts to read [or access] data underneath the mark. Uniformity in thickens of the mark may ensure minimization or absence of non-recoverable parity mismatches when the optical data reader attempts to read [or access] data underneath the mark when the mark is in either the first optical state or second optical state."

One embodiment of the present disclosure is directed to an optical article with a plurality of optically detectable marks on a first surface of the optical article, wherein a mark of the plurality of marks has a thickness of less than or equal to about 1 micrometer, and wherein the plurality of optically detectable marks have uniform thickness. In another embodiment, a mark of the plurality of marks has a thickness of less than or equal to about 1 micrometer. In still another embodiment, thickness of marks is less than or equal to about 0.5 micrometer. In one embodiment, the first surface of the optical article is the surface of the data side of the disc. As used herein the term "data side" describes the side of an optical article on which the data layer (which contains the readable data of the disc) may be disposed. In certain embodiments, the first surface may not include the non-data side or the label side of the disc.

In one embodiment, the mark of a plurality of optically detectable marks may be capable of transforming from a first optical state to a second optical state. The mark of a plurality of optically detectable marks may not create any non-recoverable parity mismatches in the optical article in either the first optical state or the second optical state.

In one embodiment, the mark of a plurality of optically detectable marks includes an optical-state change material comprising a dye or a reactive material. As used herein the term "optical-state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm. Non-limiting examples of optical-state change materials include halochromic optical-state change materials, photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical-state change materials may undergo the optical-state change under the influence of a thermal stimulus i.e., may be thermochromic or an electrical stimulus i.e., may be electrically responsive. The term "thermochromic" as used herein, describes materials that undergo either a reversible or an irreversible thermally induced color change. The term "electrically responsive" as used herein, describes materials that undergo either a reversible or an irreversible electrically induced color change. In one embodiment, the optical state change material may include light sensitive materials. For example the material may change color on exposure to the 650 nm laser that may be present in commercial DVD players.

One suitable halochromic optical-state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

As used herein, the term "chromic dye" describes optical-state change dyes which can exist in two different color forms between about 200 nm to about 800 nm. In one embodiment, the chromic dye is a triarylmethylene dye. Suitable non-limiting examples of triarylmethylene dyes include bromocresol green, bromocresol purple, and corresponding salts thereof.

In one embodiment, the optical-state change material includes a light-bleachable mark. In one embodiment, the mark may contain one or more dye compounds that exhibit a change in optical properties (e.g., photobleaching) upon exposure for a sufficient time and at a sufficient intensity to one or more wavelengths of energy (light) typically emitted by optical article reader; a diluent/solvent; an oligomeric/polymeric binder/viscosity enhancer; optionally an optical activator for the dye compound (e.g., an electron donor, a dye compound bleaching activator, or the like, or a combination thereof); and other optional components known in the art, such as dispersants, salts, or the like, or combinations thereof.

Non-limiting examples of dyes that can be used include bromocresol green, bromocresol purple, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, fluorone dyes.

In one embodiment, when the mark is in the first optical state the optical article may be considered to be in a pre-activated state of functionality and when the mark is in the second optical state the optical article may be considered to be in an activated state of functionality. In one embodiment, the difference in the percent optical reflectivity or the percent reflectivity of at least one portion of the optical data layer in the "pre-activated state" of functionality and the "activated" state of functionality is at least about 10 percent. In another embodiment, the difference in the percent optical reflectivity or the percent reflectivity of at least one portion of the optical data layer in the "pre-activated state" of functionality and the "activated" state of functionality is at least about 15 percent. In yet another embodiment, the difference in the percent optical reflectivity or the percent reflectivity of at least one portion of the optical data layer in the "pre-activated state" of functionality and the "activated" state of functionality is at least about 20 percent.

In various embodiments, the optical article comprising the mark may be transformed from a "pre-activated" state of functionality to an "activated" state of functionality. Conversion from the "pre-activated" state of functionality to the "activated" state of functionality is achieved by the activation of the mark, which is deposited in or on the optical article, such that the mark is in optical communication with the optical data layer. As used herein, the term optical communication refers to transmission and reception of light by optical devices. The mark is activated by interacting with one or more stimuli, e.g., electrical, thermal, or photo stimuli, applied directly to the mark. In one embodiment, the mark is capable of irreversibly altering the state of functionality of the optical article. In the “pre-activated” state, at least one portion of the data from the optical data layer is unreadable by the incident laser light of an optical data reader device, however, this same portion of data can be read from the optical data layer in the “activated” state of functionality.

In one of the embodiments, the mark disclosed herein is capable of transforming from a first optical state to a second optical state upon exposure to a direct electrical stimulus. As used herein, the term “direct” when used with respect to the application of the electrical stimulus to the responsive ink coating composition refers to an embodiment wherein the electrical stimulus is in physical contact with the mark.

As used herein, the term “pre-activated” state of functionality refers to a state of functionality of the optical article where the mark has not yet been exposed to one or more external stimuli, while the “activated” state refers to a state of functionality where the mark has been exposed to the external stimuli. In one embodiment, the “pre-activated” state comprises at least one mark which inhibits portions of the optical data layer that are located directly in the optical path of the incident laser light of an optical data reader from being read. The activated state comprises a state of the optical article where the optical data layer can be read by the optical data reader as a result of the article being exposed to at least one external stimulus.

In another embodiment, at least one mark is at least partially transparent to the incident laser light of an optical data reader in the pre-activated state, allowing the data on the optical layer located directly in the optical path of the laser light to be read. In this embodiment, the mark at least partially absorbs the laser light from the optical data reader in the activated state and prevents the data directly in the optical path of the laser light from being read.

The change in the optical properties of the mark upon activation can occur using at least two approaches. In the first approach, the mark at least partially absorbs the incident laser light from an optical data reader in the “pre-activated” state, and the data directly in the optical path of the laser light cannot be read. In this instance, the content stored in the optical article below the mark is unplayable. Upon converting the optical article to the “activated” state using an external stimulus, the mark is at least partially transparent to the incident laser light from an optical data reader, the data directly in the optical path of the laser light can be read, and the content below the mark comprising the optical state change material is playable.

The second approach may require an additional “authoring” component, which allows the disc to be playable or unplayable, depending on whether portions of the data on the optical data layer can be read by the incident laser light from an optical data reader. In this second approach, the mark is at least partially transparent to the incident laser light from an optical data reader in the “pre-activated” state, and the data directly in the optical path of the laser light can be read. In this instance, the optical article is “authored” unplayable. Upon converting the optical article to the “activated” state using an external stimulus, the incident laser light from the optical data reader mark is at least partially absorbed by mark, the data directly in the optical path of the laser light cannot be read, and the disc is “authored” playable.

In one embodiment, the term “limited play” may refer to a state of functionality of the optical article where at least part of the content on the optical article may be playable i.e. accessible depending on whether portions of the data on the optical data layer may be read by the incident laser light from an optical data reader. The accessibility may depend on if portions of the data may be made to be unreadable based on the optical state of a mark that may be printed on the data-side of the optical article. In various embodiments the change in the optical properties of the mark may occur using different approaches. For example in one approach, the mark at least partially absorbs the incident laser light from an optical data reader in the limited-play state, and the data directly in the optical path of the laser light may not be read. In another approach, the mark may be transparent to the incident laser light from an optical data reader and the data directly in the optical path of the laser light may be read. This may also be known as an optical article that is “authored” to be limited-play article.

Generally data on an optical article such as for example a DVD may be divided into discrete sub-units, also known as sectors. Each sector having 2048 bytes may be scrambled with a bit-shifting process to help distribute the data files over error correction code (ECC) blocks in the DVD to enable robust playback. When the optical article reader reads the data on a DVD, the entire set of data may be read and decoded. In an instance when there may be mismatches between the original data and the parity data, the player can detect and automatically correct the mismatch.

The parity mismatches may be of two types inner parity mismatch and outer parity mismatch. When a row in an ECC block has at least one byte in error it may generate an inner parity mismatch. Inner parity mismatch generation may allow for at least 5 defective bytes in each line. If there are more than about 5 defective bytes in each line, then it may not be possible to correct the inner parity mismatches in the data, and this may be referred to as an inner parity failure. The inner parity mismatches and inner parity failures may be detected using with the shareware program Kprobe. This program scans for parity mismatches, and provides us a chart of inner parity mismatches and inner parity failures in each sector.

In one embodiment, when there is an inner parity failure, the decoder may move on to the outer parity data, and will attempt to correct the data. However, in the event of an outer parity failure, the sector may show non-recoverable or unreadable parity mismatches. The outer parity mismatches and outer parity failures may be detected using the shareware program IsoBuster. The IsoBuster is a data archiving program, that allows to look at the individual sector makeup and see if a sector is readable or not. In one embodiment, the IsoBuster test may be performed manually.

In one embodiment, the optical article further comprises a wireless activation tag (also referred to as WPFT, wirelessly-powered flexible tag), which is operatively coupled (e.g., in electrical communication) to the mark. The mark is one part of an anti-theft system designed to prevent the unauthorized use of the optical article, designed to work in combination with additional components of the anti-theft system such as a removable wireless activation tag. Further details of the use of tags with optical articles as described herein can be found in U.S. patent application Ser. No. 11/567,271, filed Dec. 6, 2006.

In various embodiments, the article comprises one or more spots of the mark wherein the spots have a first surface and a second surface. In embodiments where two or more spots are employed, each of the spots may be located at a unique location on the article, designed to function in concert as part of the anti-theft system. In one embodiment, at least two spots are in direct physical contact with each other, (i.e., juxtaposed next to each other). Suitable examples of two spots in direct physical contact include, but are not limited to, concentric lines, concentric arcs, concentric spots, patterned lines, patterned arcs, patterned spots, lines or arcs which are positioned end-to-end, or any combination thereof. In one embodiment, the article comprises at least two spots, wherein at least one spot is not transparent to the incident laser light of an optical data reader in the "pre-activated" state.

For example, in one embodiment the optical article comprises two spots, a first spot having an optical absorbance greater than about 0.35 in the "pre-activated" state (a spot with absorbance of 0.35 at the wavelength of the laser light partially absorbs the laser light such that the reflectivity of the optical article is about 45 percent), and the second spot having an optical absorbance less than about 0.35 in the "pre-activated" state. Upon activation, the optical article is converted to the "activated" state where the optical properties of only the first spot is transformed such that the optical absorbance is less than about 0.35. In at least one embodiment the difference in optical absorbance between the first optical state and the second optical state of the mark is at least 0.1. In one embodiment, the transformation of the optical absorbance of either a single spot, or a combination of spots, can be combined with an additional "authoring" component, which is described above, to create a mechanism for distinguishing between a "pre-activated" state, and an "activated" state, state.

The change in optical properties of the mark in or on optical article upon exposure to a external stimulus (e.g., from the activation system) can appear in any manner that results in the optical data reader system receiving a substantial change in the amount of optical reflectivity detected. For example, where the mark is initially opaque and becomes more transparent upon exposure to an external stimulus, there should be a substantial increase in the amount of light reflected off of the data storage layer and transmitted to the optical reader device. For example, most blue materials typically change (reduce) the amount of reflected incident radiation detected by means of selective absorption at one or more given wavelengths of interest (e.g., 650 nm) corresponding to the type of optical data reader system.

In one embodiment, the mark has a maximum optical absorbance in a range of about 200 nm to about 800 nm. In another embodiment, the mark has a maximum optical absorbance in a range of about 300 nm to about 700 nm. In yet another embodiment, the mark has a maximum optical absorbance in a range of about 400 nm to about 650 nm. As discussed above, it will be appreciated that the specific wavelengths for which the absorbance of the mark of a plurality of marks is maximized may be chosen to correspond to a particular application.

For example, if the optical detectable mark comprises a dye and laser light having a wavelength of 650 nanometers is incident on the mark, in the first optical state the dye will render the mark opaque, hence the laser light may not be able to pass through and hence the data on the data layer cannot be read by a player. While in the second optical state the dye will render the mark transparent, hence the laser light may be able to pass through and hence the data on the data layer can be read by a player. In one embodiment, the mark of a plurality of optically detectable marks does not affect the playability of the optical article in either the first optical state or the second optical state.

In one embodiment, the mark of a plurality of optically detectable marks is capable of transforming from a first optical state to a second optical state. In one embodiment, when the optically detectable marks are in the first optical state they may function to render the disc or a portion of the content unreadable and when the optically detectable marks are in the second optical state they may function to render the disc or a portion of the content readable.

The length and width of the printed marks on the data side depend on the functionality and the specific application. These marks can have a width ranging from about 50 micrometers to about 1 millimeter in the radial direction from the center of the disc, and ranging from about 100 micrometers to about 2 centimeters in the tangential direction from the center of the disc.

The mark may render the optical article partially or completely unreadable in the pre-activated state of functionality of the optical article. In the pre-activated state, the mark may act as a read-inhibit layer by preventing the incident laser light of an optical data reader from reaching at least a portion of the optical data layer and reading the data on the optical data layer. For example, the mark may absorb a major portion of the incident laser light, thereby preventing it from reaching the optical data layer to read the data.

Upon interaction with one or more external stimuli, the optical absorbance of the mark may be altered to change the functionality of the optical article from the pre-activated state to the activated state. For example, in the pre-activated state, the mark may render the optical article unreadable by absorbing a portion of the wavelength from the incident laser light of an optical data reader. However, upon interaction with an external stimulus the mark becomes transparent to the wavelength of the laser light used to read the optical article, thereby making the portion of the optical data layer which is located directly in the optical path of the laser light from the optical data reader readable in the activated state. Suitable examples of external stimuli which can generate an electrical stimulus may include a laser light, infrared radiation, thermal energy, X-rays, gamma rays, microwaves, visible light, ultraviolet light, ultrasound waves, radio frequency waves, microwaves, electrical energy, chemical energy, magnetic energy, or combinations thereof which generate a stimulus. The interaction of the external stimulus with the optical article may include continuous, discontinuous, or pulsed forms of the external stimulus.

Another embodiment of the present disclosure is directed to a method of printing comprising, placing a plurality of optically detectable marks on an optical article using a screen-printing method, wherein a mark of the plurality of marks has a thickness of less than or equal to about 1 micrometer, and wherein the plurality of optically detectable marks have uniform thickness. In yet another embodiment, present disclosure is directed to a method of printing comprising, placing a plurality of optically detectable marks on an optical article using a ink-jet printing method, wherein a mark of the plurality of marks has a thickness of less than or equal to about 1 micrometer, and wherein the plurality of optically detectable marks have uniform thickness.

Screen-printing method is employed in the art to obtain prints wherein the thickness of the prints is in the order of tens of micrometers. The screen-printing method as used herein further comprises a step of determining a set of printing parameters that result in providing prints wherein the thickness of the prints may be in sub-micrometer levels. The different parameters that can be considered for optimizing the screen printing method to obtain sub-micrometer thick prints include a mesh count i.e., number of threads per inch, an emulsion thickness, a squeegee pressure, a squeegee speed and an off-contact distance between a screen and the optical article. The most important printer variables that determine the print thickness are the mesh count and the emulsion thickness.

In one embodiment, the mesh count may be in a range from about 300 threads per inch to about 500 threads per inch. In another embodiment, the mesh count may be in a range from about 325 threads per inch to about 475 threads per inch. In yet another embodiment, the mesh count may be in a range from about 350 threads per inch to about 450 threads per inch. In one embodiment, the mesh employed may be a calendered mesh. As used herein, the term "calendered mesh" means, a mesh in which the threads that are otherwise circular in cross section, are flattened on one side.

As mentioned above, the ink deposit is also a function of squeegee pressure. In one embodiment, the squeegee pressure may be in a range from about 0.5 pounds per unit length of the squeegee to about 10 pounds per unit length of the squeegee. In another embodiment, the squeegee pressure may be in a range from about 4 pounds per unit length of the squeegee to about 9 pounds per unit length of the squeegee. In still another embodiment, the squeegee pressure may be in a range from about 5 pounds per unit length of the squeegee to about 8 pounds per unit length of the squeegee. The squeegee pressure and the off-contact distance determine the edge definitions of the printed patterns.

The squeegee speed determines the throughput of the process and to a small extent the "print quality". In one embodiment, the squeegee speed may be in a range from about 2 inches per second to about 5 inches per second. In another embodiment, the squeegee speed may be in a range from about 2.5 inches per second to about 4.5 inches per second. In still another embodiment, the squeegee speed may be in a range from about 3 inches per second to about 4 inches per second.

In one embodiment, the off-contact distance between a screen and the optical article may be in a range from about 20 mils to about 70 mils (where a "mil" is 1/1000th of an inch). In still another embodiment, the off-contact distance between a screen and the optical article may be in a range from about 30 mils to about 50 mils. In one embodiment, a squeegee pressure of 2 pounds per unit length of the squeegee is used along with an off-contact distance of 50 mils.

The ink-jet printing method as used herein further comprises a step of determining a set of printing parameters that result in providing prints wherein the thickness of the prints may be in sub-micrometer levels. The different parameters that can be considered for optimizing the ink-jet printing method to obtain sub-micrometer thick prints include a nozzle diameter, a droplet volume, a droplet spacing, a jetting voltage, a waveform and a print mode. The jetting voltage and the waveform are dependent on the specific type of printer model. The most important printing variables that determine the print thickness are the droplet volume, and the droplet spacing.

In one embodiment, the nozzle diameter may be in a range of about 10 micrometers to about 20 micrometers. In another embodiment, the nozzle diameter may be in a range from about 20 micrometers to about 30 micrometers. In yet another embodiment, the nozzle diameter may be in a range from about 30 micrometers to about 50 micrometers.

As mentioned above, the ink deposit is also a function of droplet volume. In one embodiment, the droplet volume may be in a range from about 5 picoliters to about 30 picoliters. In another embodiment, the droplet volume may be in a range from about 30 picoliters to about 50 picoliters. In still another embodiment, the droplet volume may be in a range from about 50 picoliters to about 80 picoliters. The droplet volume and the droplet spacing determine the edge definitions of the printed patterns.

In one embodiment, the droplet spacing may be in a range from about 20 micrometer to about 100 micrometer. In one embodiment, the droplet spacing may be in a range from about 20 micrometer to about 25 micrometer, from about 25 micrometer to about 50 micrometer from about 50 micrometer to about 75 micrometer or from about 75 micrometer to about 100 micrometer.

In one embodiment, when a voltage known as the jetting voltage is applied, it generates a pressure pulse in the fluid forcing a droplet of ink from the nozzle. In one embodiment, the jetting voltage may be in a range from about 15 volts to about 20 volts. In another embodiment, the jetting voltage may be in a range from about 20 volts to about 35 volts. In still another embodiment, the jetting voltage may be in a range from about 35 volts to about 50 volts.

In one embodiment, the waveform employed is a pizeoelectric jetting waveform. For example, the pizeoelectric jetting waveform consists of a cycle with about 3.8 microseconds of rest at 0 Volts, about 3.7 microseconds at 100 percent of the jetting voltage, about 3.3 microseconds at 67 percent of the jetting voltage, and about 0.8 microseconds at 40 percent of the jetting voltage. The total pizeoelectric cycle time is about 11.7 microseconds for a single drop.

The droplets coalesce upon impinging on the polycarbonate substrate and the solvent starts evaporating immediately. In one embodiment, the marks may be printed in a single pass with multiple nozzles, i.e. in a single stroke in only one direction, in order to obtain a smooth surface topography. For instance, a 16 nozzle printhead is used with 10 picoliters droplet volume and a droplet spacing of 75 micrometers. In another instance, a 760 nozzle printhead is used with 8 picoliters droplet volume and a droplet spacing of 75 micrometers The mark quality depends on a subtle interplay of the surface tension and solvent evaporation rate. The length and width of the printed patterns on the optical article may range from 50 micrometers to 1 mm wide in the radial direction from the center of the disc, and can range from a few hundred micrometers to a few centimeters in the tangential direction relative to the center of the disc.

In one embodiment, the plurality of optically detectable marks may be placed on the optical article, by placing an ink composition on the optical article using the screen-printing method or ink-jet printing method. In one embodiment, the ink composition may include a binder material, an optical-state change material, an additive and a solvent.

The primary function of the binder materials is to assist the adherence of an ink composition to the surface of an article on which the ink composition is deposited. Suitable non-limiting examples of binder materials include one or more of a polymer, an oligomer, a polymeric precursor, and a polymerizable monomer. Suitable non-limiting examples of polymeric materials include poly(alkenes), poly(anilines), poly(thiophenes), poly(pyrroles), poly(acetylenes), poly(dienes), poly(acrylates), poly(methacrylates), poly(vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly(esters), poly(anhydrides), poly(urethanes), poly(sulfonates), poly(siloxanes), poly(sulfides), poly(thioesters), poly(sulfones), poly(sulfonamides), poly(amides), poly(ureas), poly(phosphazenes), poly(silanes), poly(silazanes), poly(benzoxazoles), poly(oxadiazoles), poly(benzothiazinophenothiazines), poly(benzothiazoles), poly(pyrazinoquinoxalines), poly(pyromellitimides), poly (quinoxalines), poly(benzimidazoles), poly(oxindoles), poly (oxoisoindolines), poly(dioxoisoindolines), poly(triazines), poly(pyridazines), poly(piperazines), poly(pyridines), poly (piperidines), poly(triazoles), poly(pyrazoles), poly(pyrrolidines), poly(carboranes), poly(oxabicyclononanes), poly (dibenzofurans), poly(phthalides), poly(acetals), poly (anhydrides), carbohydrates, blends of the above polymeric materials, and copolymers thereof. In one embodiment, the binder material is poly(methyl methacrylate) having a molecular weight of 450,000 grams per mole measured using gel permeation chromatography with poly(methyl methacrylate standards) and the weight percent of the binder material is about 4 weight percent based on the total weight of the ink composition. For example when PMMA is used as the binder for printing the marks, the molecular weight of PMMA may be about 450 kilogram per mole for screen printing and about 35 kilogram per mole for ink-jet printing.

In one embodiment, the ink composition comprises a polymerizable monomer, such as an acrylate monomer (e.g., methyl methacrylate), which can be polymerized (i.e. cured) to form a coating after the ink composition has been deposited on an optical article. In various embodiments, the polymer employed could be glassy or rubbery depending on whether one needs a hard or a soft coating respectively, with relatively low crystallinity so as not to interfere with the data readout.

As described herein, the term "ink composition" is used to describe a liquid composition comprising various components as described above. The viscosity of the ink composition should be such that the ink may not drip through the printing screen or through the ink-jet nozzle. In one embodiment, the ink composition has a viscosity in a range from about 0.1 cPs to about 10,000 cPs. In another embodiment, the ink composition has a viscosity in a range from about 5 cPs to about 95 cPs. In yet another embodiment, the ink composition has a viscosity in a range from about 10 cPs to about 90 cPs. In one embodiment, the ink composition used for ink-jet printing may have a viscosity in a range from about 5 cPs to about 50 cPs. In another embodiment, the ink composition used for screen printing may have a viscosity in a range from about 30 cPs to about 90 cPs.

In various embodiments, the viscosity of the ink composition may be tuned by controlling the concentration, such as for example the weight percent of the various components of the ink composition, and/or by carefully controlling a particular property of a specific component of the ink composition, such as for example, the molecular weight of the binder material. In one exemplary embodiment, where PMMA is used in the ink composition to obtain prints having sub-micrometer thickness, the molecular weight of PMMA is in a range from about 5,000 grams per mole to about 2,000,000 grams per mole. In another exemplary embodiment, the molecular weight of PMMA is in a range from about 10,000 grams per mole to about 100,000 grams per mole. In yet another exemplary embodiment, where PMMA is used in the ink composition to obtain prints having sub-micrometer thickness, the molecular weight of PMMA is in a range from about 50,000 grams per mole to about 2,000,000 grams per mole. In one embodiment, the weight percent of PMMA in the ink composition is in a range from about 2 weight percent to about 10 weight percent based on the total weight of the ink composition, and the viscosity of the resultant screen printing ink composition is about 50 cPs. For example, the weight percent of PMMA in an ink composition used for the ink-jet printing method may be in a range from about 2 weight percent to about 10 weight percent based on the total weight of the ink composition, and the viscosity of the resultant ink composition may in a range from about 8 cPs to about 15 cPs.

Suitable polymeric materials that may be used in the ink composition include non-crosslinkable and crosslinkable homopolymers and copolymers doped with commercially available dyes commonly known to those skilled in the art. Suitable non-limiting examples of polymeric materials include polyolefins, polyesters, polyamides, polyacrylates, polymethacrylates, polyvinylchlorides, polycarbonates, polysulfones, polysiloxanes, polyetherimides, polyetherketones, and blends, and copolymers thereof. In the case of non-crosslinked materials, the dye can be added at various stages of polymer processing, including the extrusion stage. In the case of crosslinkable materials (for example, thermosetting plastics such as epoxies and crosslinked acryalte resins), the dyes must be added during the production of the crosslinkable material.

In one embodiment, the additive employed in the ink composition includes one or more of a flow control additive, a leveling agent, an antifoaming agent, a humectant, and a surface tension modifier. The additives to the ink that provide different functionalities include dyes, electron transfer agents and flow control additives. In a specific embodiment of an ink-jet printing ink, 0.1 percent by weight of a polyether modified poly(dimethyl siloxane, e.g. BYK-300, BYK-377 is used as a flow control additive, or in other words, as a leveling agent. Other non-limiting examples of leveling agents include fluorinated methacrylic copolymers (e.g. Zonyl FSG) and telomers containing polyethylene glycol (e.g. Zonyl FSO100).

In various embodiments, the solvents used in the ink compositions are selected based on different parameters as discussed herein. In one embodiment, a suitable solvent may be selected to satisfy the solubility of various components in the ink composition including the binder material, the optical-state change material, and the additives.

In another embodiment, wherein the ink composition is used to deposit a coating composition, the solubility of the different components of the ink composition in the solvent should be such that there will be no phase separation of the different components during the post-deposition drying step. In a further embodiment, wherein the ink composition is used to deposit a coating composition on an article suitable solvents include those that exhibit a chemical inertness towards the material used to form the article. For example if the article is an optical article such as for example a DVD made using a polycarbonate, the selected solvent(s) should not induce solubilization, crystallization, or any other form of chemical or physical attack of the polycarbonate. This is essential to preserve the readability of the data underneath the coating composition.

In one embodiment, when solvent mixture may be employed, the volume fraction of any solvent that could potentially attack the polycarbonate may be less than about 30 percent. As used herein the term "surface tension" refers to a property of the liquid that affects the spreading of a liquid on a surface. The surface tension will have a dramatic result on the final shape of a drop or multiple drops of liquid printed on solid surfaces. With respect to the ink formulations of the present disclosure, surface tension is a critical parameter for printing the ink formulations using conventional printing techniques such as, but not limited to, ink-jet printing and screen printing.

Surface tension is also a parameter for the jetting process itself during ink-jet printing, as it will affect how drops are formed at the print-head. If the surface tension is not appropriate, inks will not be jettable with ink-jet printing. Printing of ink compositions comprising a polymer on the data side of optical media typically results in the formation of "coffee-stains", characterized by non-uniform drying of the spots and migration of solids to the edges. In one embodiment, a solvent mixture consisting of solvents that differ significantly in their boiling points may be used. For example, the ink composition may comprise a mixture of Dowanol DPM and diacetone alcohol in the ratio of about 7:3. This results in minimizing or avoiding the formation of coffee-stains on screen-printing or ink-jet printing. In another embodiment of an ink-jet printing ink, the solvent consists of a mixture of Dowanol DPM and diacetone alcohol in the ratio 1:1.

Other aspects of suitable solvents include, but are not limited to, low vapor pressure and high boiling points so that the ink is printable by methods known to one skilled in the art, such as for example, screen printing or ink-jet printing methods. Solvents with lower boiling points may evaporate rapidly from the ink, causing clogging of ink-jet print head nozzles or drying onto a printing screen, either of which can lead to poor quality of the resultant coating. In one embodiment, a solvent with a boiling point above 130° C. is preferred. In various embodiments, the ink composition should be a physical mixture of the various components and there should be no reactivity between the components at least under ambient conditions.

In one embodiment, suitable solvents employed in the ink composition include, but are not limited to: a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, an oxygenated hydrocarbon solvent, or miscible combinations thereof. Some specific suitable non-limiting examples of such solvents include diacetone alcohol, dipropylene glycol methyl ether (Dowanol DPM), butyl carbitol, ethylene glycol, glycerol with glycol ethers, cyclohexanone, and miscible combinations thereof.

As used herein, the term emulsion thickness means the thickness of the emulsion coating on the printing screen. Typically, the emulsion thickness should be as small as possible to minimize the ink deposit. The ink deposit may be further reduced by using the calendered mesh. In one embodiment, the printing screen may have an emulsion thickness in a range from about 1 micrometer to about 30 micrometers. In another embodiment, the printing screen may have an emulsion thickness in a range from about 2 micrometers to about 25 micrometers. In still another embodiment, the printing screen may have an emulsion thickness in a range from about 5 micrometers to about 20 micrometers. In one embodiment, the printing screen may be characterized by a 400 count calendered mesh and an emulsion thickness of about 10 micrometers As discussed above, the ink composition is capable of transforming from a first optical state to a second optical state upon exposure to a stimulus. The change from the first optical state to the second optical state occurs due to the presence of the optical-state change material. In one embodiment, the transformation from the first optical state to the second optical state is a bistable transformation. As used herein, the term "bistable transformation" is defined as a condition where the optical state of the ink composition corresponds to one of two possible free energy minima and the ink composition remains in its current optical state in the absence of an external activating stimulus. For example, when the optical state change material is a thermochromic material the bistable transformation may occur when the ink composition is subjected to a thermal stimulus of above about 80° C. In one embodiment, the ink composition comprising a thermochromic optical-state change material is transformed from the first optical state to the second optical state in a temperature range from about 80° C. to about 200° C. In another embodiment, the ink composition is transformed from the first optical state to the second optical state in a temperature range from about 90° C. to about 190° C. In yet another embodiment, the thermochromic ink composition is transformed from the first optical state to the second optical state in a temperature range from about 100° C. to about 180° C.

In another embodiment, the difference in the optical reflectivity of the ink composition between the first optical state and the second optical state is at least 10 percent. In yet another embodiment, the difference in the percent transmittance of the optical-state change material between the first optical state and the second optical state is at least 10 percent.

In one embodiment, the ink composition has a maximum optical absorbance in a range of about 200 nm to about 800 nm. In another embodiment, the ink composition has a maximum optical absorbance in a range of about 300 nm to about 700 nm. In yet another embodiment, the ink composition has a maximum optical absorbance in a range of about 400 nm to about 650 nm. It will be appreciated that the specific wavelengths for which the absorbance of the composition is maximized may be chosen to correspond to a particular application. For instance, if the composition is intended for use with DVD systems, the choice of wavelength should desirably correspond to the wavelengths in use in DVD players.

In one embodiment, at least one component of the ink composition may be encapsulated inside a coating material. The coating material serves to segregate the encapsulated component from additional components of the ink composition. The coating material is selected such that it may be temperature sensitive or electrically responsive. The temperature sensitive coating material is selected such that it can be melted, dissolved, or otherwise fractured at a particular temperature, thereby freeing the encapsulated component to interact with at least one additional component of the ink composition. The electrically responsive coating material is selected such that it can be fractured at a particular voltage, thereby freeing the encapsulated component to interact with at least one additional component of the ink composition. In one embodiment, the optical-state change material may be encapsulated inside the coating material. In yet another embodiment, a Bronsted acid may be encapsulated inside the coating material. In still yet another embodiment, a Bronsted base may be encapsulated inside the coating material.

In another embodiment, the ink composition further comprises at least one pH modifier. Suitable pH modifiers include either acids or bases. These pH modifiers may be of various types, including a mineral acid, an organic acid, a Lewis acid, a Bronsted acid, a superacid, an acid salt, an organic base, a Lewis base, a Bronsted base, a superbase, and basic salts. Suitable non-limiting examples of pH modifiers include acetic acid, trifluoroacetic acid, hydrochloric acid, nitric acid, sulfuric acid, triflic acid salts, benzoic acid, toluene sulfonic acid, ethanoic acid, oxalic acid, citric acid, ammonia, iodonium salts, triethylamine, methyl amine, cyclohexylamine, dicyclohexylamine, 1,8-bis(dimethylamino)naphthalene, 1,4-diazabicyclo[2.2.2]octane, pyridine, imidazole, potassium hydroxide, sodium hydroxide, dinonylnaphthalene sulfonate, dodecylbenzene sulfonate, p-toluenesulfonate, (4-phenoxyphenyl)diphenylsulfonium trifluoromethanesulfonate, bis(4-t-butylphenyl)iodonium p-toluenesulfonate, (4-t-butylphenyl)diphenylsulfonium triflate, triphenylsulfonium triflate, diphenyliodoniumhexafluorophosphate, ethyl p-toluenesulfonate, diphenyliodonium chloride, 4-octyloxyphenyl phenyl iodonium fluoroantimonate, ammonium hexafluroantimonate, and ethyl benzoate.

In various embodiments, the ink compositions further comprise an electrolyte material. The electrolyte material primarily functions to move charge within the electrically responsive material. The concentration of the electrolyte in the electrically responsive coating is such that the ion conductivity of the coating is equal to or greater than about 10-8 S/cm. Suitable electrolyte materials may include ionic materials, solvent-based liquid electrolytes, polyelectrolytes, polymeric electrolytes, solid electrolytes, and gel electrolytes.

Examples of suitable gel electrolytes may include appropriate redox active components and small amounts of multiple ligand-containing polymeric molecules gelled by a metal ion complexing process. Organic compounds capable of complexing with a metal ion at a plurality of sites (e.g., organic compounds including ligating groups) may be used in various embodiments. A given redox component may be a liquid by itself or have solid components dissolved in a liquid solvent. Ligating groups are functional units that contain at least one donor atom rich in electron density, e.g., oxygen, nitrogen, sulfur, phosphorous, among others. Multiple ligating groups, which may be present in the polymeric material, may occur in either the side chain or part of the materials molecular backbone, in part of a dendrimer, or in a starburst molecule.

In various embodiments, the electrolyte composition may include a gelling compound having a metal ion and an organic compound capable of complexing with the metal ion at a plurality of sites. Suitable metal ions include alkali and alkaline earth metals, such as lithium. In one embodiment, the organic compound may be a polymeric compound. Suitable organic compounds include poly(4-vinyl pyridine), poly(2-vinyl pyridine), polyethylene oxide, polyurethanes, and polyamides. In one embodiment, the gelling compound may be a lithium salt having the chemical formula LiX, wherein X may be a suitable anion, such as, for example, a halide, perchlorate, thiocyanate, trifluoromethyl sulfonate, or hexafluorophosphate. In another embodiment, the electrolyte solution includes a compound of the formula $M_iY_j$, wherein i and j are both variables independently having a value greater than or equal to 1. Y may be a suitable monovalent or polyvalent anion such as a halide, perchlorate, thiocyanate, trifluoromethyl sulfonate, hexafluorophosphate, sulfate, carbonate, or phosphate, and M is a monovalent or polyvalent metal cation such as Li, Cu, Ba, Zn, Ni, lanthanides, Co, Ca, Al, Mg, or other suitable metals.

In one embodiment, the polymeric electrolyte may include poly(vinyl imidazolium halide) and lithium iodide and/or polyvinyl pyridinium salts. Suitable polyelectrolytes may include between about 5 percent and about 95 percent by weight of a polymer based on the total weight of the ink composition, such as for example, an ion-conducting polymer, and about 5 percent to about 95 percent by weight of a plasticizer based on the total weight of the ink composition. The ion-conducting polymer may include, for example, poly (ethylene oxide) (PEO), poly(propylene oxide) (PPO), poly (acrylonitrile) (PAN), poly(methyl methacrylate) (PMMA), poly(ethers), and poly(phenols).

In various embodiments, the ink composition may further include a plasticizer. Plasticizers are typically low molecular weight non-volatile substances which, when added to the polymer matrix, alter the properties of the matrix. For example, adding a plasticizer can increase the ionic conductivity of the ion conducting polymer matrix, decrease the glass transition temperature of the polymer, increase the flexibility of the material, reduce the crystallinity of the polymer matrix, increase the polymer segmental motion and/or increase compatibility between the polymer and electrolyte blends. The plasticizer may assist in the dissociation of the ionic salt (i.e., electrolyte). The plasticizer needs to be compatible with the polymer so that phase separation of the plasticizer from the polymer matrix, resulting in poor film quality and/or decrease in ion conductivity, does not occur. In one embodiment, the plasticizers may have a boiling point greater than about 80° C. Examples of suitable plasticizers include ethylene carbonate, propylene carbonate, mixtures of carbonates, dimethyl carbonates, polyethylene glycol dimethyl ether, ethylene glycol, tetraethylene glycol, butyrolactone, dialkylphthalates (e.g., bis(2-ethylhexyl)phthalate and dibutylphthalate), 1,3-dioxolane, glymes such as tetraglyme, hexaglyme and heptaglyme, ionic liquids such as imidazolium salts (e.g., 1-methyl-3-octyl imidazolium bromide) and pyrrolidinium salts (e.g., 1-butyl-1-methylpyrrolidiniun bis (trifluoromethylsulfonyl)imide, polycaprolactone triol, bis (2-ethylhexyl)fumerate, bis(2-butoxyethyl)adipate, bis(2-ethylhexyl)sebacate, cellulose acetate, bis(2-ethylhexyl) adipate, glycerol propoxylate, bis(2-(2-butoxy)ethyl)adipate, triethylene glycol bis(2-ethylhexanoate)polyethyleneimine, diisodecyl adipate, bis(3,4-epoxy cyclohexyl-methyl) adipate, trioctyl trimellitate, dimethylformamide and dimethylsulfoxide.

In one embodiment, the additives include flow control additives. In an exemplary embodiment for an ink-jet printing ink, about 0.1 percent by weight of a polyether modified poly(dimethyl siloxane) may be used as a flow control additive also sometimes known as a leveling agent. Other non-limiting examples of leveling agents include fluorinated methacrylic copolymers (e.g. Zonyl FSG) and telomers containing polyethylene glycol (e.g. Zonyl FSO100).

In one embodiment, the marks deposited on the optical article using the ink composition form a mark of a plurality of marks with specific patterns on the surface of the optical article. The marks comprises at least one optical-state change material, at least one electrolyte material, and at least one binder material, wherein the mark is essentially free of solvent, and has a maximum optical absorbance in a range from about 200 nm to about 800 nanometers, and wherein the mark is capable of transforming from a first optical state to a second optical state upon exposure to an electrical stimulus. As used herein, the term "essentially free of solvent" means that the mark may contain less than about 0.1 weight percent of solvent based on the total weight of the mark. In another embodiment the mark described above further comprises an optional plasticizer material. In another embodiment the mark described above further comprises an optional pH modifier material. In yet another embodiment, the present invention provides an article comprising the mark deposited in or deposited on the article.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article comprises a polycarbonate. In one embodiment, the placing a plurality of optically detectable marks is carried out on a first surface of the optical article.

The print quality, particularly the edge definition and the surface roughness depend on the post-printing drying step. The temperature employed for printing and for the post-printing drying step should be such that they should not affect the physical properties of the optical article, for example, optical article may warm at a certain temperature. For example, DVDs made of polycarbonate, may not be subjected to temperatures higher than 80° C. as they may warp. In an exemplary embodiment, DVDs screen printed at room temperature, are dried at 60° C. in a convection oven for 4 minutes after printing. In one embodiment, the optical article is at a temperature in a range from about 50° C. to 80° C. during the printing.

Other deposition methods for incorporating polymeric spots on the data side of optical media include direct write, pad printing, microarray deposition, capillary dispense, gravure printing and adhesion of pre-made polymer films.

In another example, where the optical article includes a DVD, in one embodiment, the "pre-activated" state of functionality is characterized by an optical reflectivity of at least a portion of the optical article being substantially less than about 45 percent. In another embodiment, the "pre-activated" state of functionality is characterized by an optical reflectivity of at least a portion of the optical article being less than about 20 percent. In yet another embodiment, the "pre-activated" state of functionality is characterized by an optical reflectivity of at least a portion of the optical article being less than about 10 percent. In these embodiments, the data in the optical data layer of the optical storage medium is not readable in the pre-activated state. It should be appreciated that any portion of the optical article that has an optical reflectivity of less than about 45 percent may not be readable by the optical data reader of a typical DVD player. Furthermore, the activated state is characterized by an optical reflectivity of that same portion of the optical article being substantially more than about 45 percent.

It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

In various embodiments, the mark may be deposited in a discrete area on the optical article, such that at least one spot, at least one line, at least one radial arc, at least one patch, a continuous layer, or a patterned layer extends across at least a portion of the optical article. One or more marks may be deposited on the optical article in various forms, such as a discrete portion, a continuous film, or a patterned film. During authorization, the mark may be stimulated in a continuous, discontinuous or pulsed form.

Alternatively, instead of being deposited on the surface of the optical article, the mark may be deposited inside the structure of the optical article. In optical storage articles, the mark may be deposited in the substrate on which the optical data layer is deposited. In alternate embodiments, the mark may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the activated, or the pre-activated state of the optical article. Upon interaction with external stimulus, the mark present inside the substrate changes color. As a result, the substrate may become transparent to the laser light, thereby facilitating the transmittance of laser light through the substrate and making the optical article readable.

In some embodiments, at least a portion of the mark is coated with an optically transparent second layer. The optically transparent second layer serves as a protective coating for the mark from chemical and/or physical damage. The optically transparent second layer may contain cross-linkable materials that can be cured using ultraviolet (UV) light or heat. Furthermore, the optically transparent second layer may be a scratch resistant coating. For example, the optically transparent second layer may include, but is not limited to, a matrix consisting of cross-linkable acrylates, silicones, and nano silicate particles. Suitable examples of an optically transparent second layer can be found in U.S. Pat. No. 5,990,188.

In yet another embodiment, the present disclosure is directed to a method for manufacturing an optical article comprising aligning the optical article, printing one or more optically detectable marks on a first surface of the optical article with an ink composition, wherein the ink composition comprises a binder material, an optical-state change material, an additive and a solvent. As discussed above the printing is carried out using a screen-printing method.

In one embodiment, the method of manufacturing the optical article further comprises an inspection step. In one embodiment, the ink composition employed for printing does not affect the optical clarity or haze of the optical article. In one embodiment, one or more marks of the plurality of the optically detectable marks are printed over specific physical sectors on the optical article.

EXAMPLES

Example 1

Provides a Screen Printing Ink Composition and a Method for Preparing the Same A 20 milliliters (ml) vial was charged with 5 grams (g) of dipropylene glycol methyl ether, 5 g of diacetone alcohol, and 530 milligrams (mg) of PMMA with a weight average molecular weight of about 450,000 g per mole using a light scattering detector. The resultant solution was stirred at 70° C. for about 1 hour until the polymer was completely dissolved. The solution was then cooled to room temperature (about 22° C.), and 100 mg of the dye H-Nu-Blue-640 from Spectra Group Ltd. Inc. was completely dissolved to yield a homogeneous screen printing ink composition. The viscosity of the ink composition was measured to be 50 cPs, using a Brookfield Viscometer.

Example 2

Provides a Mark Deposited Using the Screen Printing Ink Composition of Example 1

Figure 2:
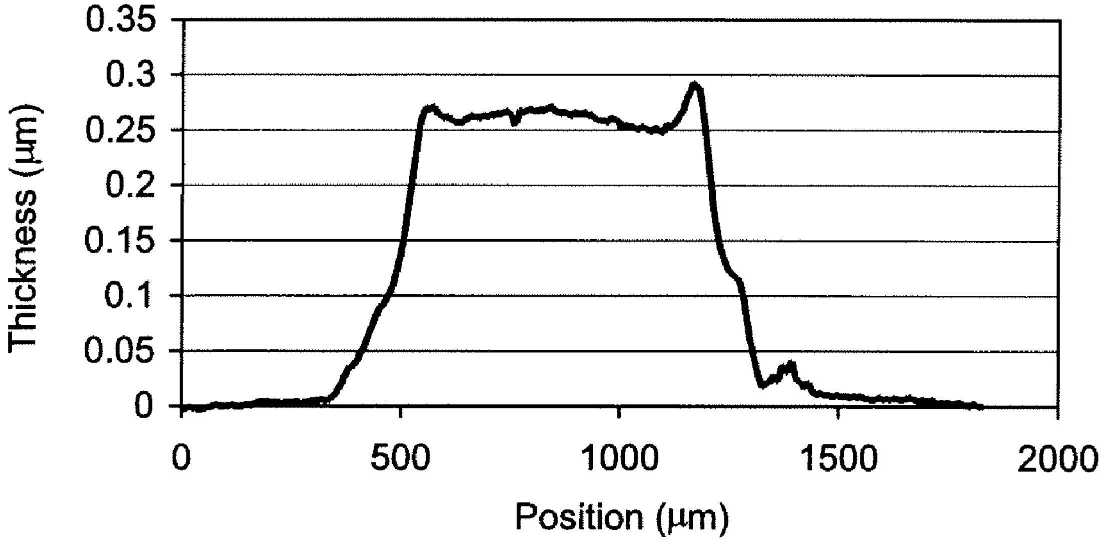
FIG. 2 shows the optical profilometry line scan of a screen printed coating obtained according to an embodiment described herein.

A mark of the screen printing ink composition prepared in Example 1 was deposited on the surface of a DVD-5 disc using an Affiliated Manufacturer, Inc. Screen Printing machine. Screen-printing was done by using a calendered mesh with a thread count of 400 and an emulsion thickness of 10 micrometers. A 80 durometer diamond shaped squeegee, at a squeegee pressure of 4 pounds per linear inch, and an off-contact distance of 50 mil with a squeegee speed of 3 inches per second was employed for printing in both directions of squeegee without any flooding. The dimensions of the mark obtained was about 1 millimeter long and 0.5 millimeter wide. The resultant mark was at first dried at 70° C. for 3 minutes and then dried at room temperature (about 22° C.) for about 12 hours to form a patterned mark on the surface of the DVD-5 disc. The thickness of the mark was then determined by optical profilometry using a MicroXAM surface profiler. This equipment used phase-shifting interferometric technology with an optical microscope to provide non-contact 3D measuring of coating thickness and roughness. The mark was imaged in its entirety so that thickness variations over different regions of the spot could be characterized. In this example, the average thickness of the spot was measured to be 0.26 micrometer. The optical profilometry image and a cross-sectional line scan of a representative spot are provided in FIGS. 1 and 2. The relative standard deviation (RSD) of the spot thickness measured as a percentage of the mean thickness, not counting the edges, was as little as 2.3 percent.

Example 3

Figure 3:
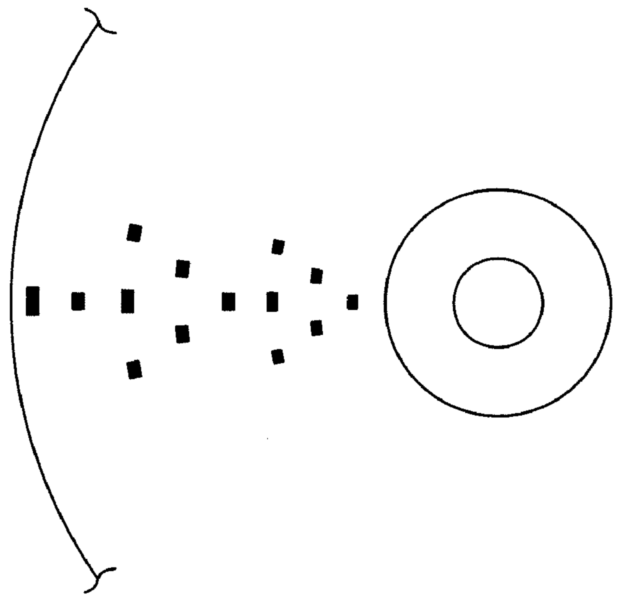
FIG. 3 is a schematic representation of a spot pattern screen-printed on a DVD according to an embodiment described herein.
Figure 4:
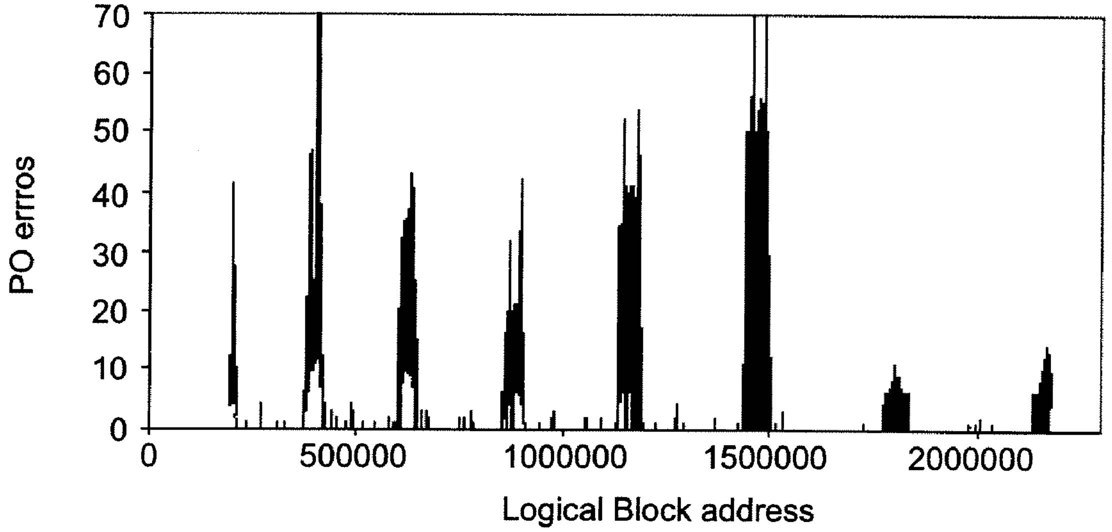
FIG. 4 shows the graphical data for parity mismatch scan before bleaching the spots on a DVD according to an example described herein.
Figure 5:
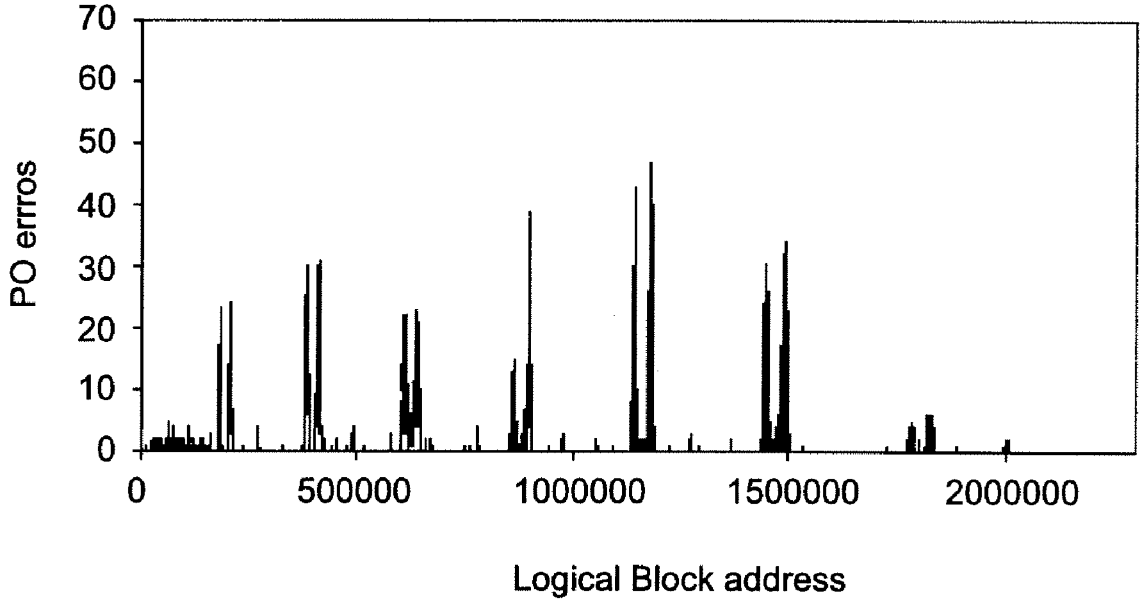
FIG. 5 shows the graphical data parity mismatch scan after bleaching the spots on a DVD according to an example described herein.

Provides Data on Parity Mismatches on Screen Printed Spots on a DVD, Before and After Bleaching of the Coatings A series of different marks, with lengths of 1 millimeter to 2 millimeter and a width of 0.5 millimeter to 1 millimeter were screen printed on a DVD at different radii, are shown schematically in FIG. 3. The number of spots at a particular radius varied between one and three. All the spots were printed with the same screen using a single print stroke so that they were all of similar in thickness, in the range of 0.25 to 0.35 micrometer. The screen printing ink contained a blue dye H-Nu-Blue-640 from Spectra Group Ltd Inc. that has an absorbance at 650 nm wavelength. The outer parity mismatches were characterized using a measurement tool called Kprobe (i.e., Lite-on drive with Kprobe software). The outer parity mismatches were high in the initially unbleached blue spots. FIG. 4 shows the data for outer parity mismatches before bleaching, when the spots were blue. The mismatches however decreased when the spots were bleached, as shown in FIG. 5.

Example 4

Figure 6:
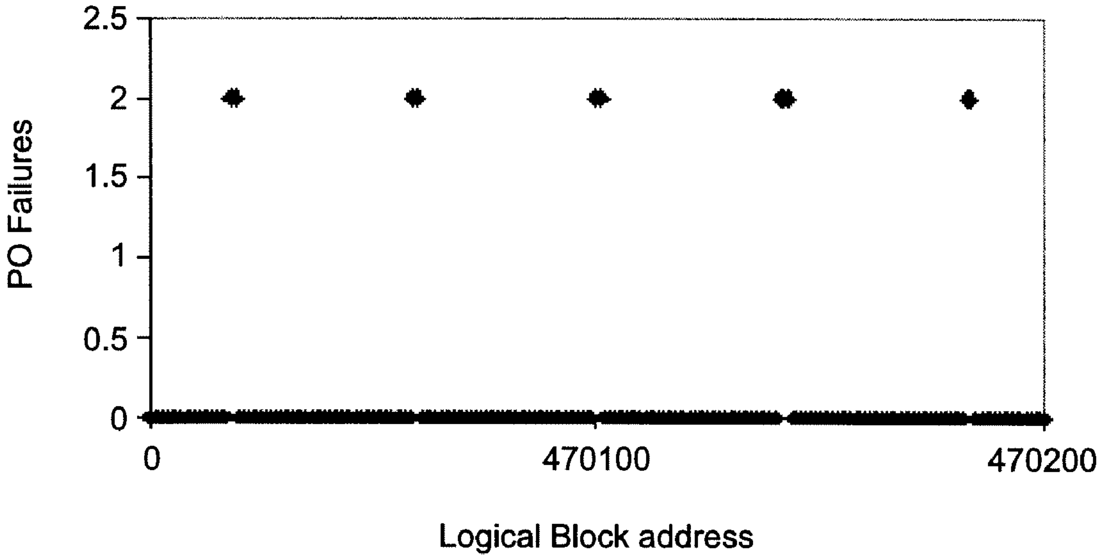
FIG. 6 shows the IsoBuster data for a set of screen printed spots on a DVD, before bleaching, according to an example described herein.
Figure 7:
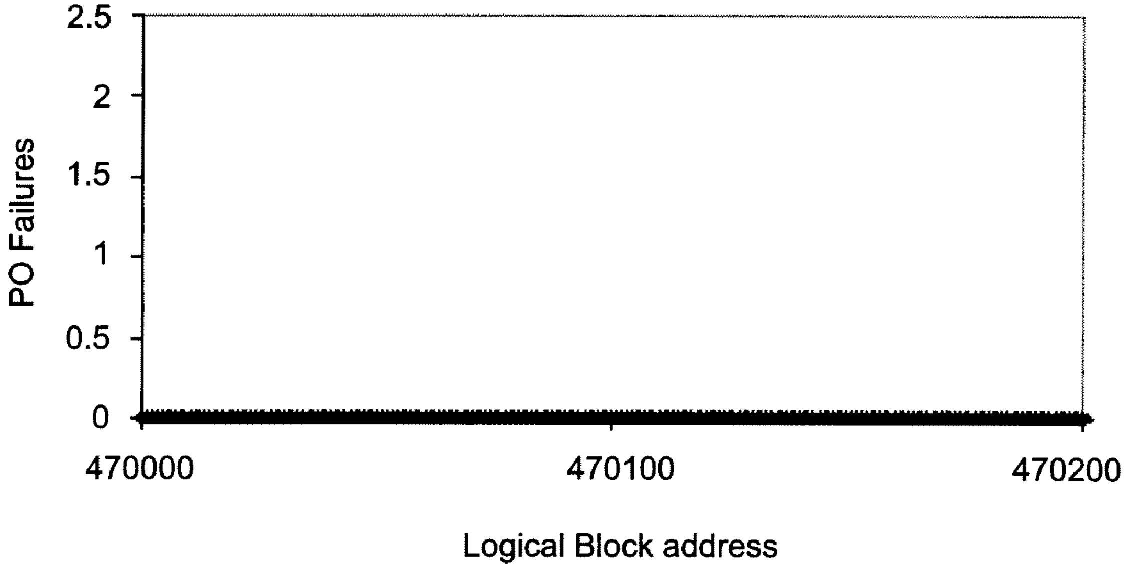
FIG. 7 shows the IsoBuster data for a set of screen printed spots on a DVD, after bleaching, according to an example described herein.

Provides Data for Non-Recoverable Parity Mismatches Before and After Bleaching of a Coating Obtained Via Screen Printing Method A series of 5 spots 1 millimeter wide and 1 millimeter long were screen printed on a DVD with a spacing of 0.5 millimeter between the spots. The non-recoverable parity mismatches were characterized by using IsoBuster tool. FIG. 6 shows the IsoBuster data across the spots before bleaching, and FIG. 7 shows the same after bleaching. In the "unbleached" state, the mark showed periodic sectors with non-recoverable parity mismatches in IsoBuster. The periodicity of the non-recoverable parity mismatches was found to be proportional to the number of sectors at a particular radius. When the spots were bleached using a halogen lamp the non-recoverable parity mismatches disappeared, and the DVD player provided a playback without these mismatches.

Example 5

Provides an Ink-Jet Printing Ink and a Method for Preparing the Same

A 20 ml vial was charged with 1.836 g of dipropylene glycol methyl ether, 1.836 g of diacetone alcohol, and 200 mg of polyvinyl pyrrolidone (PVPD) with a weight average molecular weight of about 55,000 gram per mole as measured using gel permeation chromatography using polystyrene standards. The resultant solution was stirred at 70° C. for about 1 hour until the polymer was completely dissolved. The solution was then cooled to room temperature (about 22° C.), and 24 mg of H-Nu-Blue-640 dye and 104 mg of a Borate V (Spectra Group Ltd Inc) were added. The resulting mixture was sonicated in a water bath sonicator for 2 hours and then placed on a shaking apparatus for 12 hours. The components completely dissolved to yield a blue-colored homogeneous ink suitable for ink-jet printing. The viscosity of the ink composition was measured to be 11 cPs, using a Brookfield Viscometer with a stainless steel cone-and-plate spindle.

Example 6

Provides a Mark Deposited Using the Ink-Jet Printing Ink Composition of Example 5

Figure 12:
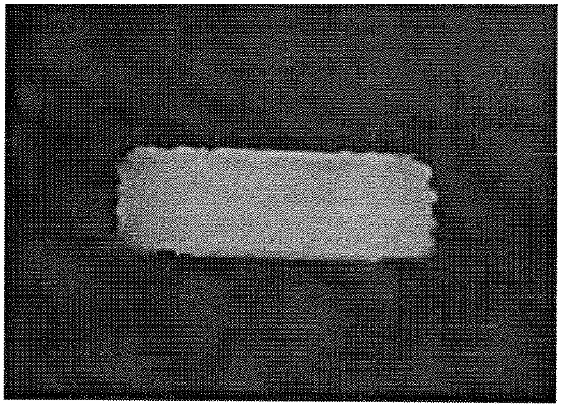
FIG. 12 shows the optical profilometry image of an ink-jet printed spot, uniform in thickness, according to an example described herein.
Figure 13:
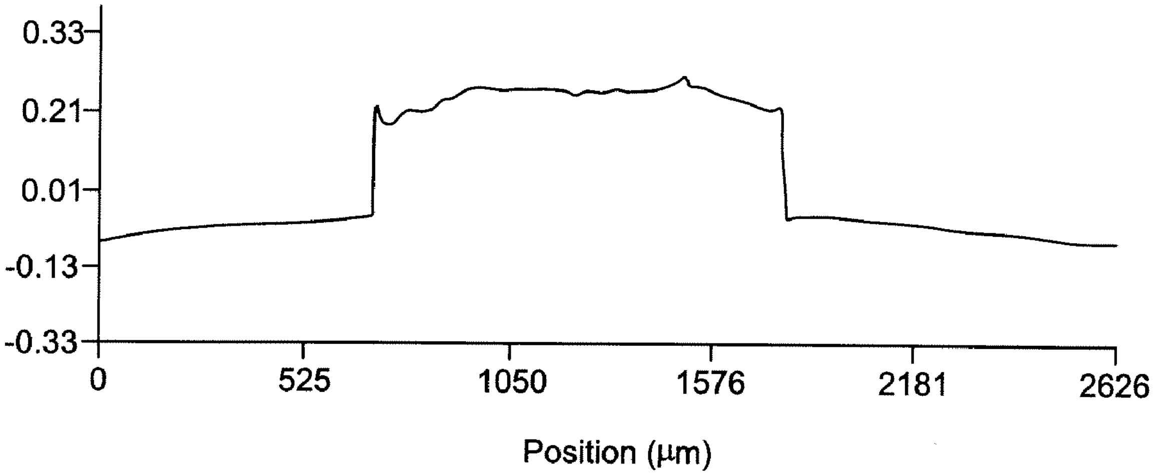
FIG. 13 shows the optical profilometry line scan of an ink-jet printed spot, uniform in thickness, according to an example described herein.

A mark of the ink-jet printing ink composition prepared in Example 5 was deposited on the surface of a DVD-5 disc using a Dimatix DMP-2800 ink-jet printer with 16 pizoelectric nozzles. Ink-jet printing was done by using a jetting voltage of 36 volts with a waveform consisting of a cycle with 3.854 microseconds of rest at 0 volts, 3.712 microseconds at 100 percent of the jetting voltage, 3.392 microseconds at 67 percent of the jetting voltage, and 0.832 microseconds at 40 percent of the jetting voltage. The total pizoelectric cycle time was about 11.79 microseconds for a single drop. The droplet spacing was set at 75 micrometers, and the disc substrate was pre-warmed on a heated plate to 60° C. before printing. The pattern that was printed on the disc surface was a rectangle with dimensions of approximately 300 micrometers×1000 micrometers (4×13 pixels at 75 micrometers spacing). The pattern was deposited in a single stroke of the 16-nozzle printhead. The resultant patterned mark on the surface of the DVD-5 disc was at first held at 60° C. for 5 minutes by leaving the disc on the plate, the disc was further dried at room temperature (about 22° C.) for about 12 hours. The thickness of the mark was then determined by optical profilometry and found to be about 0.25 micrometers. The optical profilometry image and a cross-sectional line scan of a representative spot are provided in FIGS. 12 and 13, respectively.

Example 7

Figure 20:
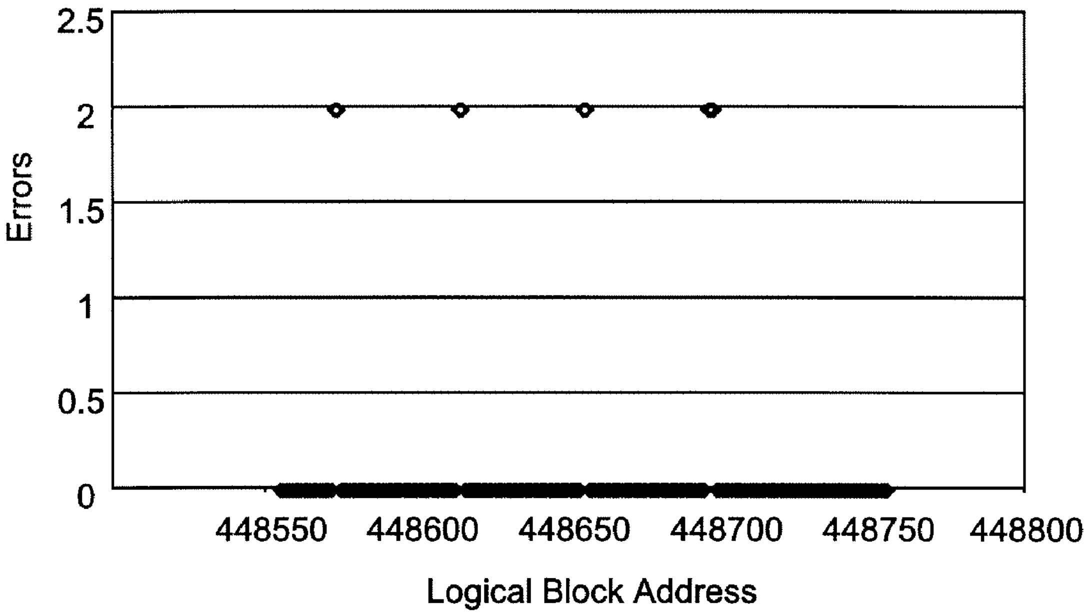
FIG. 20 shows the IsoBuster data for a set of ink-jet printed spots on a DVD, before bleaching, according to an example described herein.
Figure 21:
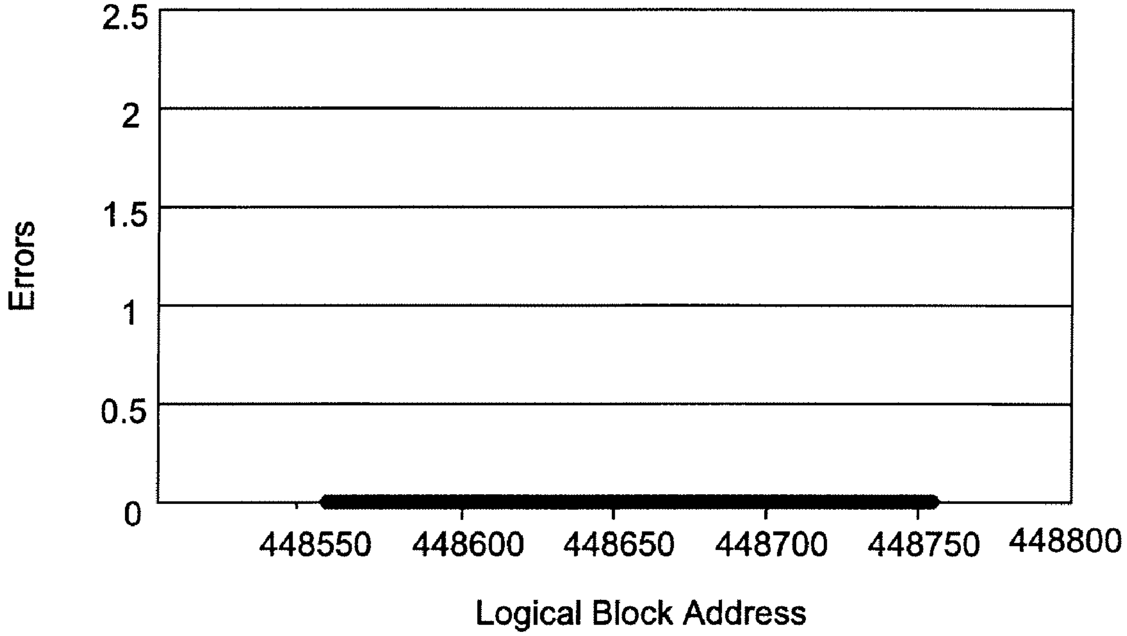
FIG. 21 shows the IsoBuster data for a set of ink-jet printed spots on a DVD, after bleaching, according to an example described herein.

Provides Data for Non-Recoverable Parity Mismatches Before and After Bleaching of a Mark Obtained Via Ink-Jet Printing A series of 7 spots 1 mm long and 0.5 mm wide were ink-jet printed on a DVD with a spacing of 0.5 mm between the marks. FIG. 20 and FIG. 21 show the IsoBuster data before and after bleaching of the ink-jet printed spots. In the unbleached state, the spots showed periodic sectors with non-recoverable parity mismatches in IsoBuster. The periodicity of the mismatches was proportional to the number of sectors at a particular radius. When the mark was bleached under a halogen lamp the non-recoverable parity mismatches disappeared, and the DVD player provided a playback without these mismatches.

Example 8

Figure 8:
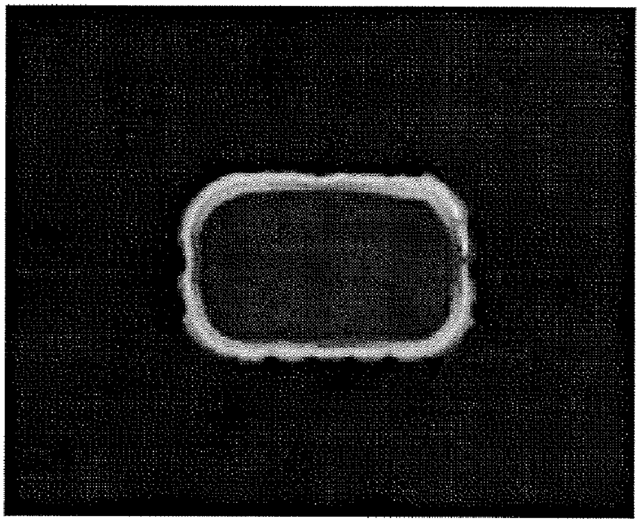
FIG. 8 shows the optical profilometry image of an ink-jet printed spot printed from a formulation that has only diacetone alcohol as the solvent.
Figure 9:
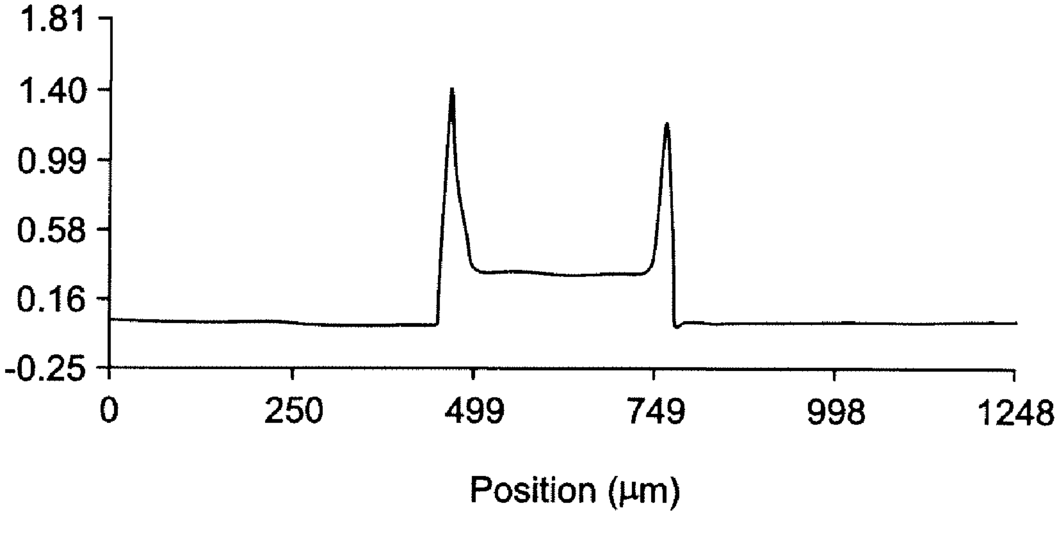
FIG. 9 shows the optical profilometry line scan of an ink-jet printed spot printed from a formulation that has only diacetone alcohol as the solvent.

Demonstrates the Non-Uniform Quality of a Spot that Occurred when Only One Solvent was Used in the Ink Composition An ink-jet printing composition was prepared as in Example 5, using only diacetone alcohol as the solvent, instead of a mixture of Dowanol DPM and diacetone alcohol. The printing was carried out under conditions similar to those of Example 6. FIG. 8 provides an optical profilometry image of an ink-jet printed spot printed from a single solvent ink composition. A cross-sectional line segmental scan of the same shown in FIG. 9 shows the non-uniformity in the spot thickness. The edges were found to be taller than the center and this may also be known as the “coffee stain” phenomenon.

Example 9

Illustrates the Effect of Droplet Spacing on Spot Quality

Figure 10:
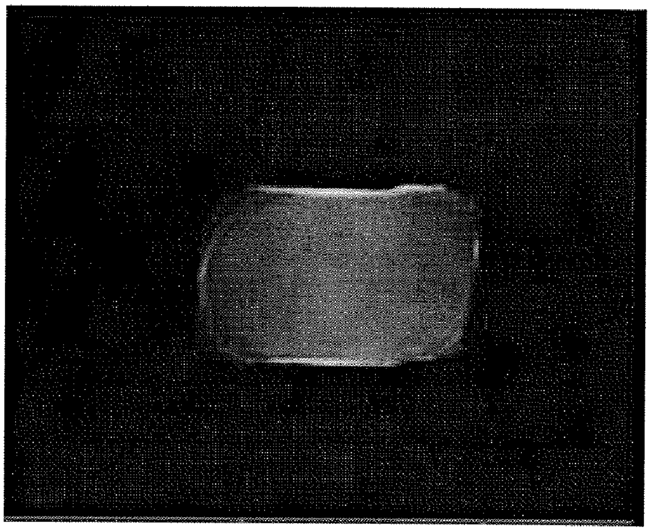
FIG. 10 shows the optical profilometry image of an ink-jet printed spot printed with 50 micrometers droplet spacing according to an example described herein.
Figure 11:
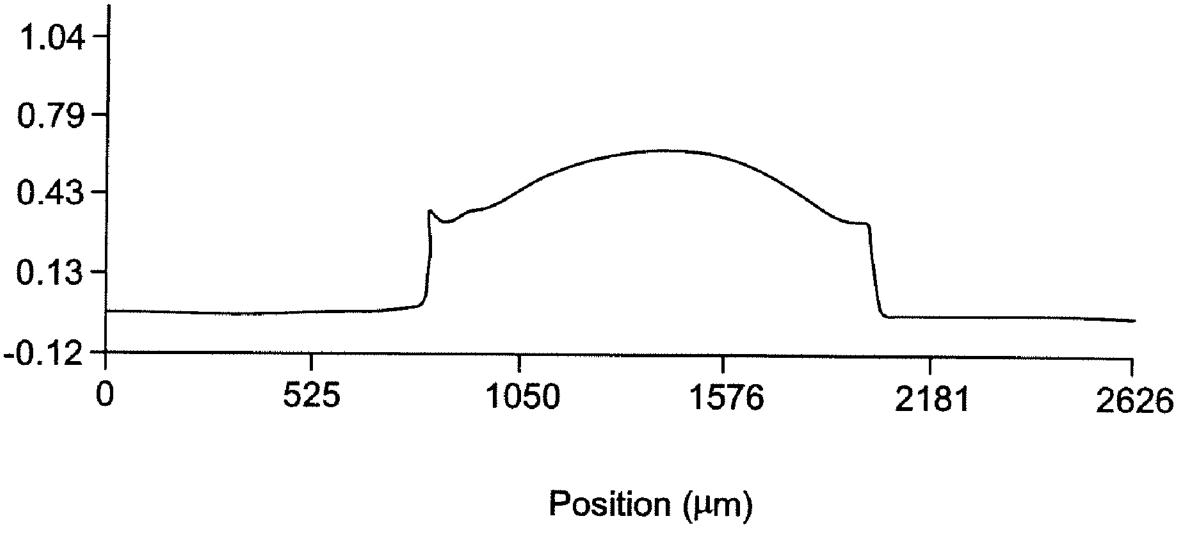
FIG. 11 shows the optical profilometry line scan of an ink-jet printed spot printed with 50 micrometers droplet spacing according to an example described herein.

A series of spots were ink-jet printed on a DVD using a droplet spacing of 50 micrometers while maintaining the rest of the printing matters similar to those used in Example 6. The ink composition prepared in Example 5 was used for printing the spots. The resultant spots were thicker at the center when compared to the edges. The non-uniform spots may have resulted since the droplets spacing was reduced. FIG. 10 and FIG. 11 provide a profilometry image and line segment scan of the spot of non-uniform thickness.

Example 10

Demonstrates the Effect of Substrate Temperature on the Print Quality

Figure 14:
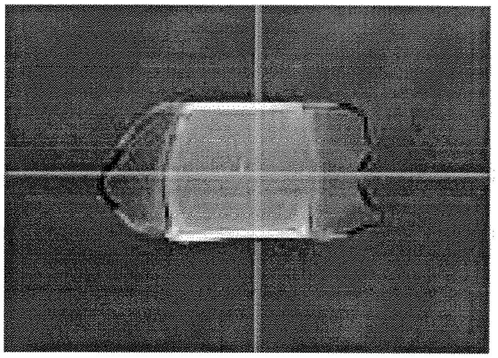
FIG. 14 shows the optical profilometry image of an ink-jet printed spot printed at room temperature, according to an example described herein.
Figure 15:
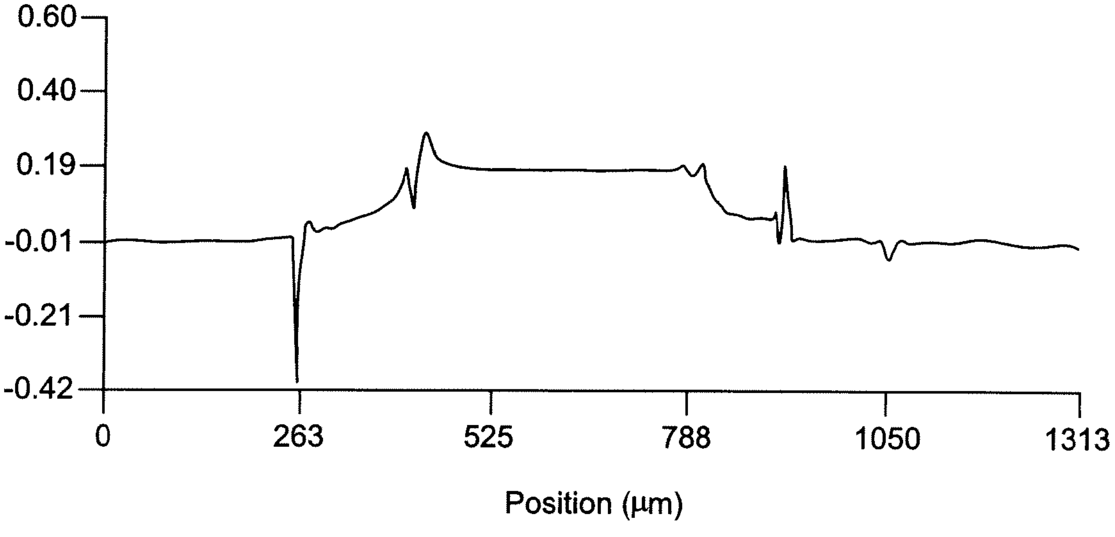
FIG. 15 shows the optical profilometry line scan of an ink-jet printed spot printed at room temperature, according to an example described herein.

An ink composition was prepared similar to that prepared in Example 5 except that PMMA was used in place of as PVPD. All the printing parameters were same as in Example 6, except that the substrate was maintained at room temperature (22° C.). The resultant spots indicate that printing at room temperature provides uneven spot profiles in spite of the use of a solvent mixture in the ink composition and optimized droplet spacing. FIG. 14 and FIG. 15 show the profilometry image and a line scan of a spot thus printed and dried at room temperature.

Example 11

Figure 16:
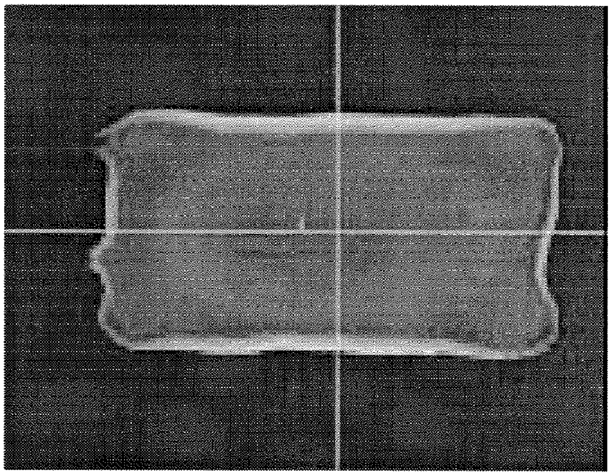
FIG. 16 shows the optical profilometry image of an ink-jet printed spot with flow control additive, according to an example described herein.
Figure 17:
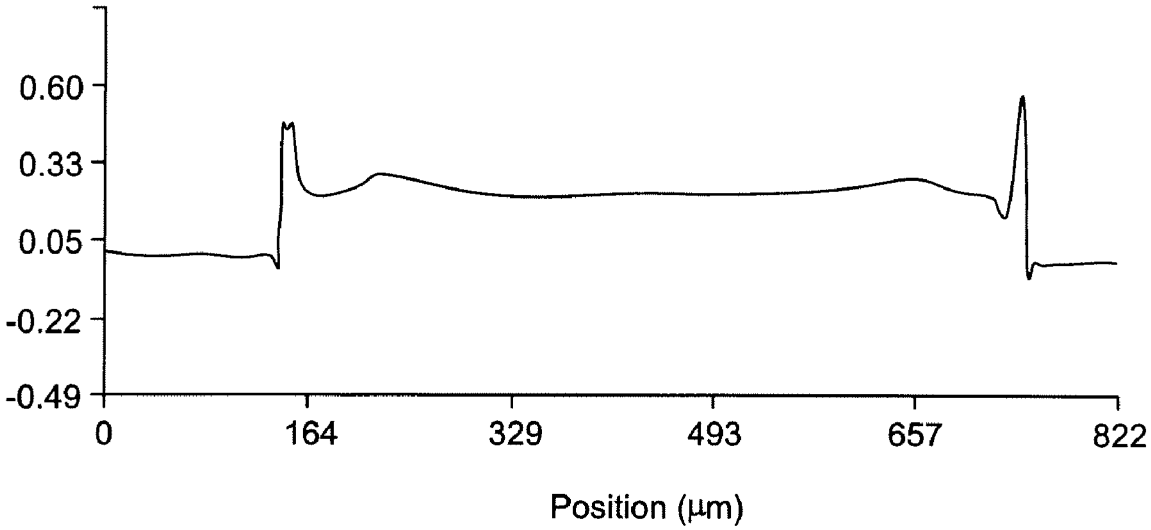
FIG. 17 shows the optical profilometry line scan of an ink-jet printed spot with flow control additive, according to an example described herein.
Figure 18:
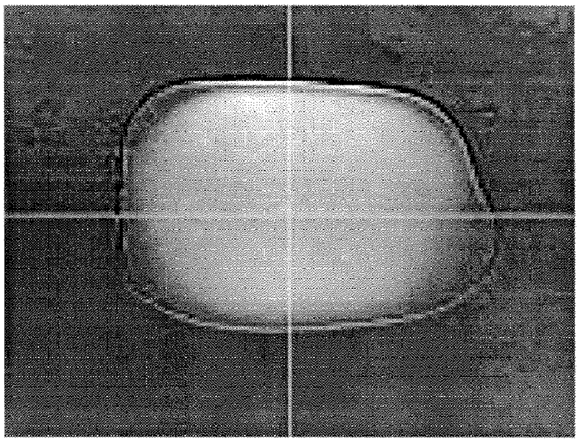
FIG. 18 shows the optical profilometry image of a spot, ink-jet printed at room temperature, according to an example described herein.
Figure 19:
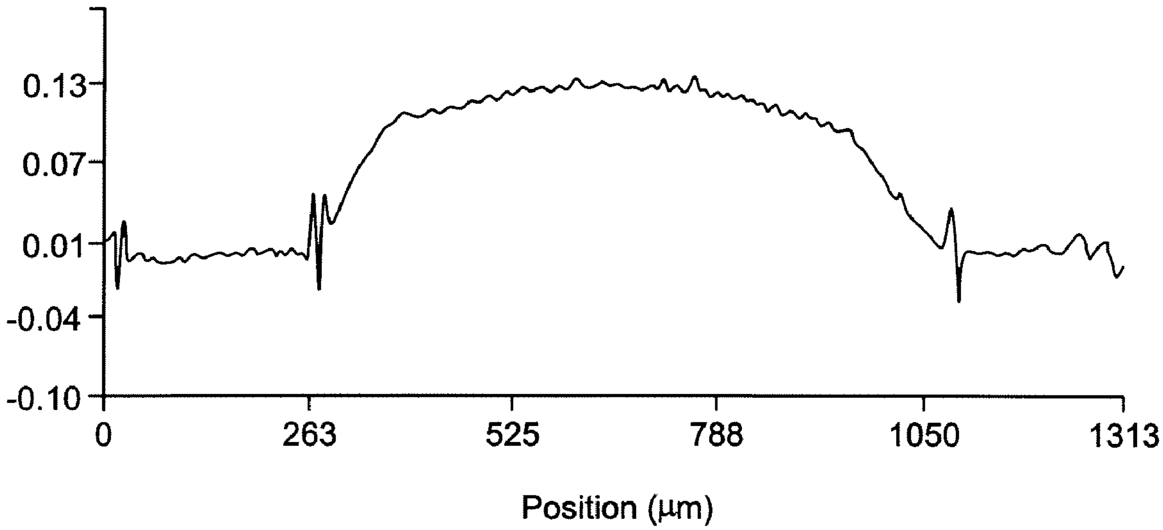
FIG. 19 shows the optical profilometry line scan of a spot, ink-jet printed at room temperature, according to an example described herein.

Demonstrates Effect of a Flow Control Additive on the Print Quality of the Spots Printed on a Substrate at Room Temperature An ink composition was prepared similar to that prepared in Example 5 except that PMMA was used in place of as PVPD and 0.1 weight percent of polyether modified poly (dimethyl siloxane) leveling agent, was added. All the printing parameters were same as in Example 6, except that the substrate was maintained at room temperature (22° C.). The resultant spots indicate that printing at room temperature using an ink composition having a flow control additive provided relatively less uneven spot profiles. FIG. 16 and FIG. 17 present the profilometry image and a line scan a spot printed with a flow control additive.

Example 12

Demonstrates Effect of Change in Solvent Mixture on the Print Quality of the Spots Printed on a Substrate at Room Temperature An ink composition was prepared similar to that prepared in Example 5, except that a solvent mixture of 70 percent diacetone alcohol and 30 percent butyl carbitol was used. The spots were printed using the same printing parameters as in Example 6. The spot appeared to be relatively smooth on the surface with the absence of coffee stain phenomenon.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical article comprising a plurality of optically detectable marks on a data storage portion of the optical article; wherein the plurality of marks has a uniform thickness of less than or equal to about 1 micrometer; and wherein at least a portion of the plurality of optically detectable marks comprises an optical state change material.

2. The optical article of claim 1, wherein one or more of the plurality of optically detectable marks is capable of transforming from a first optical state to a second optical state.

3. The optical article of claim 2, wherein the one or more of the plurality of optically detectable marks does not create any non recoverable parity mismatches in the optical article in either the first optical state or the second optical state.

4. The optical article of claim 1, wherein the optical state change material comprises one or more of a dye, or a reactive material.

5. The optical article according to claim 1, wherein the optical article comprises one of a CD, a DVD, a HD-DVD, a Blu-ray disc, a near field optical storage disc, a holographic storage medium, an identification card, a passport, a payment card, a driving license, or a personal information card.

6. The optical article according to claim 1, wherein of the optical article comprises polycarbonate.

7. The optical article according to claim 1, wherein the optical article is dried at a temperature in a range from about 50° C. to 80° C. after the printing.

8. A method of printing comprising:

placing a plurality of optically detectable marks on a data storage surface of an optical article using a screen-printing method; wherein the plurality of marks has a uniform thickness of less than or equal to about 1 micrometer; and wherein at least a portion of the plurality of optically detectable marks includes an optical-state change material.

9. The method according to claim 8, wherein the screen printing method further comprises a step of determining a set of printing parameters.

10. The method according to claim 9, wherein the printing parameters comprise a mesh count, a squeegee pressure, a squeegee speed and an off-contact distance between a screen and the optical article.

11. The method according to claim 10, wherein the mesh count is in a range of about 300 threads per inch to about 500 threads per inch.

12. The method according to claim 10, wherein the squeegee pressure is in a range of about 1 pound to about 10 pounds per unit length of the squeegee.

13. The method according to claim 10, wherein the squeegee speed is in a range of about 1 inch per second to about 5 inches per second.

14. The method according to claim 10, wherein the off-contact distance between a screen and the optical article is in a range of about 20 mil to about 70 mil.

15. The method according to claim 8, wherein the mark of the plurality of marks has a thickness ranging from about 50 nanometers to about 1 micrometer.

16. The method according to claim 8, wherein placing a plurality of optically detectable marks on an optical article comprises placing an ink composition on the optical article using the screen-printing method.

17. The method according to claim 16, wherein the ink composition has a viscosity of at least 50 centiPoise.

18. The method according to claim 16, wherein the ink composition comprises: a binder material, an optical-state change material, an additive and a solvent.

19. The method according to claim 18, wherein the binder material comprises a polymer, an oligomer, a polymeric precursor, or a polymerizable monomer.

20. The method according to claim 18, wherein the binder material has a molecular weight in a range of about 50,000 grams per mole to 2,000,000 grams per mole as measured using gel permeation chromatography.

21. The method according to claim 18, wherein the weight percent of the binder material in the ink composition ranges from about 2 percent to about 10 percent based on the total weight of the ink composition.

22. The method according to claim 18, wherein the binder material is poly(methyl methacrylate) with a molecular weight of 450,000 grams per mole measured using gel permeation chromatography; and wherein the weight percent of the binder material is about 4 weight percent based on the total weight of the ink composition.

23. The method according to claim 18, wherein the additive comprises one or more of a flow control additive, a leveling agent, an antifoaming agent, a humectant, or a surface tension modifier.

24. The method according to claim 18, wherein the solvent comprises one or more of a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, an oxygenated hydrocarbon solvent, or miscible combinations thereof.

25. The method according to claim 18, wherein the solvent comprises one or more of diacetone alcohol, dipropylene glycol methyl ether (Dowanol DPM), butyl carbitol, ethylene glycol, glycerol, cyclohexanone, and miscible combinations thereof.

26. The method according to claim 8, wherein the screen has an emulsion thickness in a range of about 1 micrometer to about 30 micrometers.

27. An optical article made in accordance with the method of claim 8.

28. A method for manufacturing an optical article comprising aligning the optical article, and printing one or more optically detectable marks over specific physical sectors of the optical article using a screen-printing method with an ink composition; wherein the ink composition comprises a binder material, an optical-state change material, an additive and a solvent.

29. The method according to claim 28, wherein the ink composition does not affect the optical clarity or haze of the optical article.

* * * * *